(12) United States Patent
Wang et al.

(10) Patent No.: US 11,309,993 B2
(45) Date of Patent: Apr. 19, 2022

(54) CODING AND DECODING METHOD AND APPARATUS

(71) Applicant: HUAWEI TECHNOLOGIES CO., LTD., Guangdong (CN)

(72) Inventors: Jian Wang, Hangzhou (CN); Yunfei Qiao, Hangzhou (CN); Gongzheng Zhang, Hangzhou (CN); Chaolong Zhang, Hangzhou (CN); Guijie Wang, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 74 days.

(21) Appl. No.: 16/692,684

(22) Filed: Nov. 22, 2019

(65) Prior Publication Data

US 2020/0092039 A1  Mar. 19, 2020

Related U.S. Application Data

(63) Continuation of application No. PCT/CN2018/088149, filed on May 24, 2018.

(30) Foreign Application Priority Data

May 24, 2017  (CN) .......................... 201710372634.3

(51) Int. Cl.
*H04L 1/00* (2006.01)
*H04W 72/04* (2009.01)

(52) U.S. Cl.
CPC .......... *H04L 1/0057* (2013.01); *H04L 1/0033* (2013.01); *H04L 1/0036* (2013.01); *H04W 72/042* (2013.01)

(58) Field of Classification Search
CPC ....... H04L 1/0057; H04L 1/00; H04L 1/0033; H04L 1/0036; H04L 1/0053; H04L 1/0072; H04W 72/042
See application file for complete search history.

(56) References Cited

U.S. PATENT DOCUMENTS

2010/0061491 A1  3/2010 Choi et al.
2015/0091742 A1  4/2015 Ionita et al.
(Continued)

FOREIGN PATENT DOCUMENTS

CN  103281166 A  9/2013
CN  103516476 A  1/2014
(Continued)

OTHER PUBLICATIONS

Huawei,"HARQ scheme for polar codes",3GPP TSG RAN WG1 Meeting #87,R1-16113301,Reno, USA, Nov. 14-18, 2016, total 41 pages.
(Continued)

*Primary Examiner* — Betsy Deppe
(74) *Attorney, Agent, or Firm* — Womble Bond Dickinson (US) LLP

(57) ABSTRACT

This application provides a coding and decoding method and apparatus. The method includes: performing polarization coding on first to-be-coded information, to obtain first coded information with a bit sequence length of M, where M is a positive integer; sending the first coded information on a first channel corresponding to the first to-be-coded information; performing polarization coding on second to-be-coded information, to obtain second coded information with a bit sequence length of 2M, where the second to-be-coded information includes the first to-be-coded information, and differences between sequence numbers of information bits corresponding to the first to-be-coded information and sequence numbers of information bits at $(M+1)^{th}$ to $2M^{th}$ bit positions in information bits corresponding to the second to-be-coded information are sequentially M in ascending order of sequence numbers.

15 Claims, 9 Drawing Sheets

(56) References Cited

U.S. PATENT DOCUMENTS

2016/0013810 A1    1/2016  Gross et al.
2019/0393987 A1*  12/2019  Hong .................... H04L 1/0057

FOREIGN PATENT DOCUMENTS

| CN | 105027479 A | 11/2015 |
|---|---|---|
| CN | 106685656 A | 5/2017 |

OTHER PUBLICATIONS

Samsung,"On UE-Common NR-PDCCH",3GPP TSG RAN WG1 #88,R1-1702970,Athens, Greece, Feb. 13 17, 2017, total 4 pages.
Huawei,"IR-HARQ scheme for polar codes",3GPP TSG RAN WG1 NR Ad-Hoc Meeting,R1-1700406,Spokane, USA, Jan. 16-20, 2017, total 4 pages.

* cited by examiner

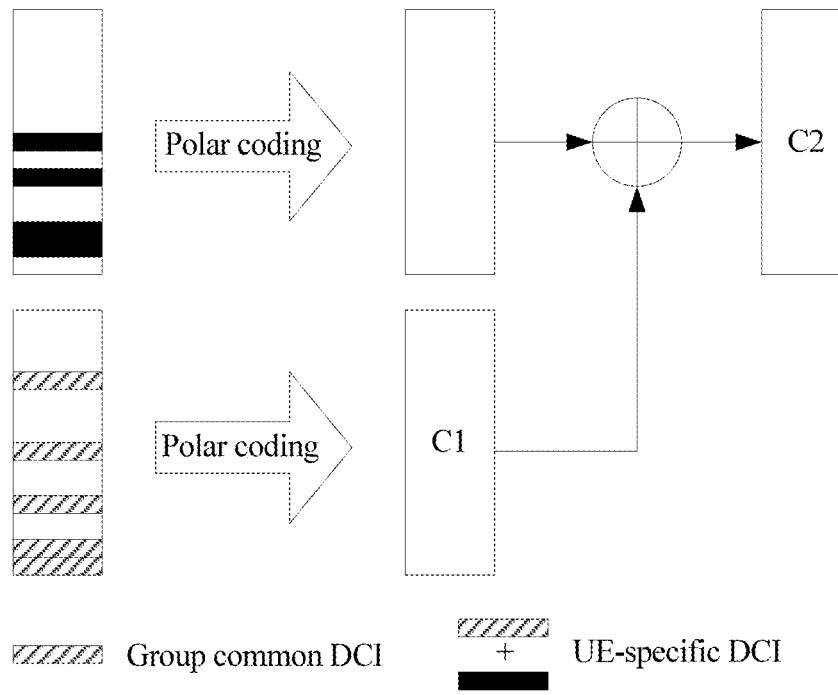

FIG. 6

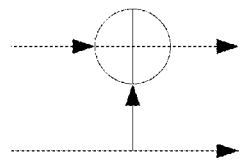

FIG. 7

| A receive end receives first to-be-decoded information sent by a transmit end on a first channel, and performs polarization decoding on the first to-be-decoded information, to obtain first decoded information | S301 |
|---|---|
| The receive end receives second to-be-decoded information sent by the transmit end on a second channel, and when the receive end determines that the first to-be-decoded information is correctly decoded, the receive end performs polarization decoding on the second to-be-decoded information by using the first decoded information, to obtain second decoded information, where the second decoded information and the first decoded information include same first information | S302 |

FIG. 8

CODING AND DECODING METHOD AND APPARATUS

CROSS-REFERENCE TO RELATED APPLICATIONS

This application is a continuation of International Application No. PCT/CN2018/088149, filed on May 24, 2018, which claims priority to Chinese Patent Application No. 201710372634.3, filed on May 24, 2017. The disclosures of the aforementioned applications are hereby incorporated by reference in their entireties.

TECHNICAL FIELD

This application relates to the field of communications technologies, and in particular, to a coding and decoding method and apparatus.

BACKGROUND

A communications system usually performs channel coding to improve data transmission reliability and ensure communication quality. A polar (polar) code is the first channel coding method that strictly proves to "reach" a channel capacity. The polar code is a linear block code. A generator matrix of the polar code is $G_N$, and a coding process of the polar code is $x_1^N = u_1^N G_N$, where $u_1^N = (u_1, u_2, K, u_N)$ is a binary row vector with a length of N (namely, a code length), $G_N$ is a matrix of N×N, $G_N = F_2^{\otimes(\log_2(N))}$, where $$F_2 = \begin{bmatrix} 1 & 0 \\ 1 & 1 \end{bmatrix},$$

and $G_N$ is defined as a Kronecker (Kronecker) product of $\log_2 N$ matrices $F_2$. In a conventional polar code coding process, some bits in $u_1^N$ are used to carry information and referred to as information bits, and a set of indexes of the information bits is denoted as A. The other bits are set to fixed values pre-agreed on by a receive end and a transmit end (which are referred to as frozen bits), a set of indexes of the frozen bits is denoted as a complementary set $A^c$ of A, and the frozen bits are usually set to 0. A frozen bit sequence may be randomly set, provided that the receive end and the transmit end pre-agree on the frozen bit sequence.

A frame structure of a fifth-generation (5G) mobile communications technology supports symbol-level uplink and downlink switching, to be specific, in a plurality of symbols in one slot, some symbols are used for uplink transmission, some symbols are used for downlink transmission, and some symbols are used as guard intervals for uplink and downlink switching. 5G further supports a dynamic change of a proportion of uplink symbols to downlink symbols in a slot. Therefore, one piece of signaling is required to indicate a slot structure and a change of the slot structure to UE. 5G proposes a group common downlink control channel (PDCCH) on which group common downlink control information (DCI) is sent to a group of user equipment (UE). The group DCI may carry information indicating a slot structure. The group common PDCCH may be carried by a PDCCH, or may be an individually designed physical channel. To distinguish between the group common PDCCH and a conventional PDCCH, the conventional PDCCH on which UE-specific DCI is sent is referred to as a UE-specific PDCCH herein. In addition, in 5G, regardless of whether the UE receives the group common DCI on the group common PDCCH, the UE needs to correctly receive the UE-specific DCI sent by a base station to the UE on the UE-specific PDCCH, and perform a subsequent data sending/receiving operation. The group common DCI is mainly used to send control information that includes information such as a slot structure to an unscheduled user, and the UE-specific DCI sent by the base station to a scheduled user on the UE-specific PDCCH also needs to include information such as a slot structure. Therefore, the group common DCI and the UE-specific DCI include the same information (for example, the slot structure).

In an LTE system, a process of transmitting DCI by a base station is as follows: After individually coding and modulating each piece of DCI, the base station maps the DCI to a PDCCH and then sends the DCI to UE, in other words, a plurality of pieces of DCI delivered by the base station in a same subframe are modulated and mapped after being separately coded. Therefore, if the method continues to be used in 5G to separately code group common DCI and UE-specific DCI, coding and decoding performance is relatively poor.

SUMMARY

This application provides a coding and decoding method and apparatus, so as to resolve a problem of relatively poor coding and decoding performance.

According to a first aspect, this application provides a coding method, including: performing, by a transmit end, polarization coding on first to-be-coded information, to obtain first coded information with a bit sequence length of M, where M is a positive integer; sending, by the transmit end, the first coded information on a first channel corresponding to the first to-be-coded information; performing, by the transmit end, polarization coding on second to-be-coded information, to obtain second coded information with a bit sequence length of 2M, where the second to-be-coded information includes the first to-be-coded information, and differences between sequence numbers of information bits corresponding to the first to-be-coded information and sequence numbers of information bits at $(M+1)^{th}$ to $2M^{th}$ bit positions in information bits corresponding to the second to-be-coded information are sequentially M in ascending order of sequence numbers; and sending, by the transmit end, the second coded information on a second channel corresponding to the second to-be-coded information. When separately encoding the first to-be-coded information and the second to-be-coded information, the transmit end codes the first to-be-coded information into a code word with a code length of M, and codes the second to-be-coded information into a code word with a code length of 2M. In addition, it is ensured that the differences between the sequence numbers of the information bits corresponding to the first to-be-coded information and the sequence numbers of the information bits at the $(M+1)^{th}$ to $2M^{th}$ bit positions in the information bits corresponding to the second to-be-coded information are sequentially M in ascending order of sequence numbers. Because the second to-be-coded information includes the first to-be-coded information, $(M+1)^{th}$ to $2M^{th}$ bits in a coded code word corresponding to the second to-be-coded information and a coded code word with the length of M corresponding to the first to-be-coded information are consistent. Because of such the consistency, when performing decoding, a receive end may combine the first to-be-coded information and the second to-be-coded information, and perform polarization decoding with the code length of 2M, to obtain the second to-be-coded information. Therefore, coding and decoding performance can be improved.

In one embodiment, the performing, by a transmit end, polarization coding on first to-be-coded information includes: obtaining, by the transmit end, the first to-be-coded information and a coded bit sequence length M; determining, by the transmit end, bit positions of first frozen bits and bit positions of first information bits in the first to-be-coded information based on M; and determining, by the transmit end, bit values at the bit positions of the first frozen bits and bit values at the bit positions of the first information bits, and performing polarization coding on all the determined bits.

In one embodiment, the performing, by the transmit end, polarization coding on second to-be-coded information, to obtain second coded information with a bit sequence length of 2M includes: obtaining, by the transmit end, the second to-be-coded information and a coded bit sequence length 2M; determining, by the transmit end, bit positions of second frozen bits and bit positions of second information bits in the second to-be-coded information based on 2M, where differences between sequence numbers of the second information bits at the $(M+1)^{th}$ to $2M^{th}$ bit positions and sequence numbers of the first information bits are sequentially M in ascending order of sequence numbers; and determining, by the transmit end, bit values at the bit positions of the second frozen bits and bit values at the bit positions of the second information bits, and performing polarization coding on all the determined bits.

In one embodiment, the determining, by the transmit end, bit positions of first frozen bits and bit positions of first information bits in the first to-be-coded information based on M includes: obtaining, by the transmit end, preset bit positions of the first frozen bits, and using bit positions other than the bit positions of the first frozen bits as the bit positions of the first information bits; and the determining, by the transmit end, bit positions of second frozen bits and bit positions of second information bits in the second to-be-coded information based on 2M includes: obtaining, by the transmit end, preset bit positions of the second frozen bits, and using bit positions other than the bit positions of the second frozen bits as the bit positions of the second information bits, where differences between preset sequence numbers of the second frozen bits at the $(M+1)^{th}$ to $2M^{th}$ bit positions and preset sequence numbers of the first frozen bits are sequentially M in ascending order of sequence numbers.

In one embodiment, the determining, by the transmit end, bit positions of first frozen bits and bit positions of first information bits in the first to-be-coded information based on M includes: determining, by the transmit end, the bit positions of the first frozen bits and the bit positions of the first information bits in the first to-be-coded information based on M according to a first preset rule; and the determining, by the transmit end, bit positions of second frozen bits and bit positions of second information bits in the second to-be-coded information based on 2M includes: sequentially obtaining, by the transmit end in ascending order, bit position sequence numbers of the second frozen bits at the $(M+1)^{th}$ to $2M^{th}$ bit positions by adding bit position sequence numbers of the first frozen bits by M, and sequentially obtaining, in ascending order, bit position sequence numbers of the second information bits at the $(M+1)^{th}$ to $2M^{th}$ bit positions by adding bit position sequence numbers of the first information bits by M; and determining, by the transmit end, the bit positions of the second frozen bits and the bit positions of the second information bits in first to $M^{th}$ bit positions according to a second preset rule.

According to a second aspect, this application provides a decoding method, including:

receiving, by a receive end, second to-be-decoded information sent by a transmit end on a second channel, where a length of the second to-be-decoded information is 2M, and M is a positive integer; performing, by the receive end, polarization decoding on third to-be-decoded information when determining that first to-be-decoded information sent by the transmit end on a first channel is received, where the third to-be-decoded information is information obtained after the first to-be-decoded information and the second to-be-decoded information are combined, and a length of the first to-be-decoded information is M; and performing, by the receive end, polarization decoding on the second to-be-decoded information when determining that the first to-be-decoded information is not received.

In one embodiment, before the receiving, by a receive end, second to-be-decoded information sent by a transmit end on a second channel, the method further includes: receiving, by the receive end, the first to-be-decoded information, and obtaining the length M of the first to-be-decoded information.

In one embodiment, the third to-be-decoded information includes a first part and a second part, the first part is first to $M^{th}$ bit positions in the second to-be-decoded information, and the second part is a sum of first to $M^{th}$ bit positions in the first to-be-decoded information and $(M+1)^{th}$ to $2M^{th}$ bit positions in the second to-be-decoded information in sequence.

In one embodiment, the performing polarization decoding on the second to-be-decoded information includes: obtaining, by the receive end, the length 2M of the second to-be-decoded information; determining, by the receive end, bit positions of first frozen bits and bit positions of first information bits in the second to-be-decoded information based on 2M; and determining, by the receive end, bit values at the bit positions of the first frozen bits and bit values at the bit positions of the first information bits, and performing polarization decoding on all the determined bits.

In one embodiment, the performing polarization decoding on third to-be-decoded information includes: obtaining, by the receive end, a length 2M of the third to-be-decoded information; determining, by the receive end, bit positions of second frozen bits and bit positions of second information bits in the third to-be-decoded information based on 2M; and determining, by the receive end, bit values at the bit positions of the second frozen bits and bit values at the bit positions of the second information bits, and performing polarization decoding on all the determined bits.

According to a third aspect, this application provides a decoding method, including:

receiving, by a receive end, first to-be-decoded information sent by a transmit end on a first channel, and performing polarization decoding on the first to-be-decoded information, to obtain first decoded information; and when the receive end determines that the first to-be-decoded information is correctly decoded, receiving, by the receive end, second to-be-decoded information sent by the transmit end on a second channel, and performing polarization decoding on the second to-be-decoded information by using the first decoded information, to obtain second decoded information, where the second decoded information and the first decoded information include same first information. Same information between different to-be-decoded information is used to assist in decoding at the receive end, so that decoding performance can be improved.

In one embodiment, the performing polarization decoding on the second to-be-decoded information by using the first decoded information includes: determining values of known bits based on the first decoded information and a preset position of the first information in the second decoded information, where the known bits are bits at the position of the first information, and the known bits include at least one bit; and performing path selection in a decoding process based on the values of the known bits; or performing early stop in a decoding process based on the values of the known bits; or performing path selection and early stop in a decoding process based on the values of the known bits according to a preset rule. The known bits are used to assist in polar code decoding, and the known bits are used for early stop, so as to reduce a computing amount, and reduce decoding latency and power consumption. The known bits are used for path selection, so as to improve decoding performance, for example, reduce a packet error rate.

In one embodiment, the performing path selection in a decoding process based on the values of the known bits includes: when a first bit in the known bits in the second to-be-decoded information is decoded, if a log-likelihood ratio of the first bit matches a value of the first bit, skipping increasing or increasing a path metric to a first preset value, or if a log-likelihood ratio of the first bit matches a value of the first bit, increasing a path metric to a second preset value, where the second preset value is at least 10 times greater than the first preset value, and matching means that a symbol of the log-likelihood ratio is the same as a symbol indicated by the value of the known bit; sorting all current paths based on path metrics, and deleting half of the paths with a larger path metric; and when another bit in the known bits is decoded, performing a same decoding operation.

In one embodiment, the performing early stop in an SCL decoding process based on the values of the known bits includes: when a first bit in the known bits in the second to-be-decoded information is decoded, if a determining result of a log-likelihood ratio of the first bit is not equal to a value of the first bit, marking current paths; and stopping decoding when it is determined that all the current paths are marked; or continuing decoding when it is determined that there is an unmarked path in all the current paths, and when another bit in the known bits is decoded, performing a same decoding operation.

In one embodiment, the known bits are distributed between an $n^{th}$ bit and an $(n+m)^{th}$ bit, n and m are positive integers, and the preset rule is: performing early stop in a decoding process on known bits distributed between the $n^{th}$ bit and an $(n+k)^{th}$ bit, where k is a positive integer less than m, and performing path selection in a decoding process on known bits distributed between an $(n+k+1)^{th}$ bit and the $(n+m)^{th}$ bit; or performing path selection in a decoding process on known bits distributed between the $n^{th}$ bit and an $(n+k)^{th}$ bit, and performing early stop in a decoding process on known bits distributed between an $(n+k+1)^{th}$ bit and the $(n+m)^{th}$ bit; or alternately performing early stop and path selection in a decoding process on the known bits distributed between the $n^{th}$ bit and the $(n+m)^{th}$ bit based on a preset quantity of intervals.

According to a fourth aspect, this application provides a coding apparatus, including: a first coding module, configured to perform polarization coding on first to-be-coded information, to obtain first coded information with a bit sequence length of M, where M is a positive integer; a first sending module, configured to send the first coded information on a first channel corresponding to the first to-be-coded information; a second coding module, configured to perform polarization coding on second to-be-coded information, to obtain second coded information with a bit sequence length of 2M, where the second to-be-coded information includes the first to-be-coded information, and differences between sequence numbers of information bits corresponding to the first to-be-coded information and sequence numbers of information bits at $(M+1)^{th}$ to $2M^{th}$ bit positions in information bits corresponding to the second to-be-coded information are sequentially M in ascending order of sequence numbers; and a second sending module, configured to send the second coded information on a second channel corresponding to the second to-be-coded information.

In one embodiment, the first coding module is configured to: obtain the first to-be-coded information and a coded bit sequence length M; determine bit positions of first frozen bits and bit positions of first information bits in the first to-be-coded information based on M; and determine bit values at the bit positions of the first frozen bits and bit values at the bit positions of the first information bits, and perform polarization coding on all the determined bits.

In one embodiment, the second coding module is configured to: obtain the second to-be-coded information and a coded bit sequence length 2M; determine bit positions of second frozen bits and bit positions of second information bits in the second to-be-coded information based on 2M, where differences between sequence numbers of the second information bits at the $(M+1)^{th}$ to $2M^{th}$ bit positions and sequence numbers of the first information bits are sequentially M in ascending order of sequence numbers; and determine bit values at the bit positions of the second frozen bits and bit values at the bit positions of the second information bits, and perform polarization coding on all the determined bits.

In one embodiment, the first coding module is configured to: obtain preset bit positions of the first frozen bits, and use bit positions other than the bit positions of the first frozen bits as the bit positions of the first information bits; and the second coding module is configured to: obtain preset bit positions of the second frozen bits, and use bit positions other than the bit positions of the second frozen bits as the bit positions of the second information bits, where differences between preset sequence numbers of the second frozen bits at the $(M+1)^{th}$ to $2M^{th}$ bit positions and preset sequence numbers of the first frozen bits are sequentially M in ascending order of sequence numbers.

In one embodiment, the first coding module is configured to determine the bit positions of the first frozen bits and the bit positions of the first information bits in the first to-be-coded information based on M according to a first preset rule; and the second coding module is configured to: sequentially obtain, in ascending order, bit position sequence numbers of the second frozen bits at the $(M+1)^{th}$ to $2M^{th}$ bit positions by adding bit position sequence numbers of the first frozen bits by M, and sequentially obtain, in ascending order, bit position sequence numbers of the second information bits at the $(M+1)^{th}$ to $2M^{th}$ bit positions by adding bit position sequence numbers of the first information bits by M; and determine the bit positions of the second frozen bits and the bit positions of the second information bits in first to $M^{t}$h bit positions according to a second preset rule.

According to a fifth aspect, this application provides a decoding apparatus, including: a receiving module, configured to receive second to-be-decoded information sent by a transmit end on a second channel, where a length of the second to-be-decoded information is 2M, and M is a positive integer; and a processing module, configured to: perform polarization decoding on third to-be-decoded information when determining that first to-be-decoded information sent by the transmit end on a first channel is received, where the third to-be-decoded information is information obtained after the first to-be-decoded information and the second to-be-decoded information are combined, and a length of the first to-be-decoded information is M; and perform polarization decoding on the second to-be-decoded information when determining that the first to-be-decoded information is not received.

In one embodiment, the receiving module is further configured to: before receiving the second to-be-decoded information sent by the transmit end on the second channel, receive the first to-be-decoded information, and obtain the length M of the first to-be-decoded information.

In one embodiment, the third to-be-decoded information includes a first part and a second part, the first part is first to $M^{th}$ bit positions in the second to-be-decoded information, and the second part is a sum of first to $M^{th}$ bit positions in the first to-be-decoded information and $(M+1)^{th}$ to $2M^{th}$ bit positions in the second to-be-decoded information in sequence.

In one embodiment, the processing module is configured to: obtain the length 2M of the second to-be-decoded information; determine bit positions of first frozen bits and bit positions of first information bits in the second to-be-decoded information based on 2M; and determine bit values at the bit positions of the first frozen bits and bit values at the bit positions of the first information bits, and perform polarization decoding on all the determined bits.

In one embodiment, the processing module is configured to: obtain a length 2M of the third to-be-decoded information; determine bit positions of second frozen bits and bit positions of second information bits in the third to-be-decoded information based on 2M; and determine bit values at the bit positions of the second frozen bits and bit values at the bit positions of the second information bits, and perform polarization decoding on all the determined bits.

According to a sixth aspect, this application provides a decoding apparatus, including: a receiving module, configured to: receive first to-be-decoded information sent by a transmit end on a first channel, and perform polarization decoding on the first to-be-decoded information, to obtain first decoded information; and a processing module, configured to: when determining that the first to-be-decoded information is correctly decoded, receive second to-be-decoded information sent by the transmit end on a second channel, and perform polarization decoding on the second to-be-decoded information by using the first decoded information, to obtain second decoded information, where the second decoded information and the first decoded information include same first information.

In one embodiment, the processing module is configured to: determine values of known bits based on the first decoded information and a preset position of the first information in the second decoded information, where the known bits are bits at the position of the first information, and the known bits include at least one bit; and perform path selection in a decoding process based on the values of the known bits; or perform early stop in a decoding process based on the values of the known bits; or perform path selection and early stop in a decoding process based on the values of the known bits according to a preset rule.

In one embodiment, the processing module is configured to: when a first bit in the known bits in the second to-be-decoded information is decoded, if a log-likelihood ratio of the first bit matches a value of the first bit, skip increasing or increase a path metric to a first preset value, or if a log-likelihood ratio of the first bit matches a value of the first bit, increase a path metric to a second preset value, where the second preset value is at least 10 times greater than the first preset value, and matching means that a symbol of the log-likelihood ratio is the same as a symbol indicated by the value of the known bit; sort all current paths based on path metrics, and delete half of the paths with a larger path metric; and when another bit in the known bits is decoded, perform a same decoding operation.

In one embodiment, the processing module is configured to: when a first bit in the known bits in the second to-be-decoded information is decoded, if a determining result of a log-likelihood ratio of the first bit is not equal to a value of the first bit, mark current paths; and stop decoding when it is determined that all the current paths are marked; or continue decoding when it is determined that there is an unmarked path in all the current paths, and when another bit in the known bits is decoded, perform a same decoding operation.

In one embodiment, the known bits are distributed between an $n^{th}$ bit and an $(n+m)^{th}$ bit, n and m are positive integers, and the preset rule is: performing early stop in a decoding process on known bits distributed between the $n^{th}$ bit and an $(n+k)^{th}$ bit, where k is a positive integer less than m, and performing path selection in a decoding process on known bits distributed between an $(n+k+1)^{th}$ bit and the $(n+m)^{th}$ bit; or performing path selection in a decoding process on known bits distributed between the $n^{th}$ bit and an $(n+k)^{th}$ bit, and performing early stop in a decoding process on known bits distributed between an $(n+k+1)^{th}$ bit and the $(n+m)^{th}$ bit; or alternately performing early stop and path selection in a decoding process on the known bits distributed between the $n^{th}$ bit and the $(n+m)^{th}$ bit based on a preset quantity of intervals.

According to a seventh aspect, this application provides a coding apparatus, including a memory and a processor, where the memory is configured to store a program instruction; and the processor is configured to invoke the program instruction in the memory, to perform the coding method according to the first aspect and any embodiment of the first aspect.

According to an eighth aspect, this application provides a decoding apparatus, including a memory and a processor, where the memory is configured to store a program instruction; and the processor is configured to invoke the program instruction in the memory, to perform the decoding method according to the second aspect and any embodiment of the second aspect.

According to a ninth aspect, this application provides a readable storage medium, where the readable storage medium stores an executable instruction, and when at least one processor of a coding apparatus executes the executable instruction, the coding apparatus performs the coding method according to the first aspect and any embodiment of the first aspect.

According to a tenth aspect, this application provides a readable storage medium, where the readable storage medium stores an executable instruction, and when at least one processor of a decoding apparatus executes the executable instruction, the decoding apparatus performs the decoding method according to the second aspect and any embodiment of the second aspect or the decoding method according to the third aspect and any embodiment of the third aspect.

According to an eleventh aspect, this application provides a program product, where the program product includes an executable instruction, and the executable instruction is stored in a readable storage medium. At least one processor of a coding apparatus may read the executable instruction from the readable storage medium, and the at least one processor executes the executable instruction, so that the coding apparatus is enabled to implement the coding method according to the first aspect and any embodiment of the first aspect.

According to a twelfth aspect, this application provides a program product, where the program product includes an executable instruction, and the executable instruction is stored in a readable storage medium. At least one processor of a decoding apparatus may read the executable instruction from the readable storage medium, and the at least one processor executes the executable instruction, so that the decoding apparatus is enabled to implement the decoding method according to the second aspect and any embodiment of the second aspect or the decoding method according to the third aspect and any embodiment of the third aspect.

BRIEF DESCRIPTION OF DRAWINGS

FIG. 6 is a schematic diagram of a process of jointly coding group common DCI and UE-specific DCI;

FIG. 7 is a schematic diagram of a polarization operation;

FIG. 8 is a flowchart of an embodiment of another decoding method according to this application;

DESCRIPTION OF EMBODIMENTS

This application may be applied to a scenario in which polar coding and decoding are performed on information bits, and may be mainly applied to a scenario in which there is same information between different to-be-coded information. For example, this application may be applied to a scenario in which polar coding and decoding are performed on enhanced mobile broadband (eMBB) uplink control information and downlink control information, or may be applied to another scenario. For example, this application is applied to channel coding and channel coding parts such as uplink control information, downlink control information, and a sidelink channel in the communication standard TS 36.212 5.1.3. This is not limited in this application.

Figure 1:
FIG. 1 is a schematic diagram of a system architecture including a transmit end and a receive end according to this application.

A system in this application may include a transmit end and a receive end. FIG. 1 is a schematic diagram of a system architecture including a transmit end and a receive end according to this application. As shown in FIG. 1, the transmit end is a coder, and may be configured to perform coding and output coded information. The coded information is transmitted to a decoder on a channel. The receive end is the decoder, and may be configured to: receive the coded information sent by the transmit end, and decode the coded information. The transmit end and the receive end may be terminal devices (also referred to as user equipments), servers, base stations, or others device that can perform coding and decoding. This is not limited in this application. The terminal device may be a personal computer (PC), a mobile phone, a tablet computer (such as a pad), an intelligent learning machine, an intelligent game machine, a smart television, smart glasses, a smartwatch, or the like.

Network elements in this application are mainly a base station and a terminal device. This application is mainly applied to various wireless communications systems. The technical solutions in the embodiments of this application may be applied to a 5G communications system, or may be applied to various other communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, and a universal mobile telecommunication system (UMTS). The following describes a coding and decoding method and apparatus according to this application in detail with reference to the accompanying drawings.

In an LTE system, DCI is used to transmit uplink/downlink scheduling information and related common control information, and has a plurality of formats for carrying different functions. A process of transmitting DCI by a base station is as follows: After individually coding and modulating each piece of DCI, the base station maps the DCI to a downlink control channel and then sends the DCI to a terminal device. The downlink control channel is usually located on the first, the second, or the third OFDM symbol of each subframe. In the LTE system, a plurality of pieces of DCI information delivered by the base station in a same subframe are modulated and mapped after being separately coded. Therefore, if the transmission method continues to be used in 5G to separately code group common DCI and UE-specific DCI, coding and decoding performance is relatively poor. This application provides a coding and decoding method, so that same information between different to-be-coded information (for example, the group common DCI and the UE-specific DCI) can be used to perform coding or assist in decoding at a receive end, thereby improving coding and decoding performance. The following describes the solutions in this application in detail with reference to the accompanying drawings.

Figure 2:
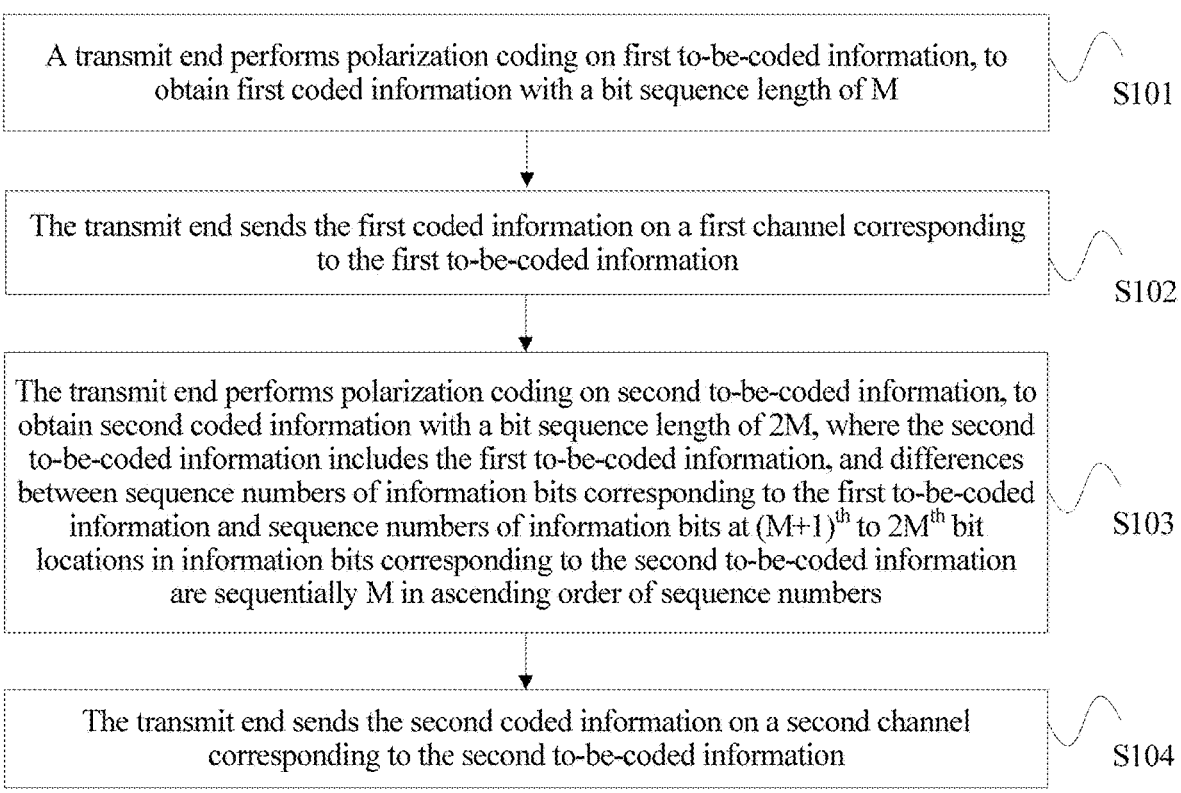
FIG. 2 is a flowchart of an embodiment of a coding method according to this application.

FIG. 2 is a flowchart of an embodiment of a coding method according to this application. As shown in FIG. 2, the method in this embodiment may include the following operations.

S101. A transmit end performs polarization coding on first to-be-coded information, to obtain first coded information with a bit sequence length of M, where M is a positive integer.

S102. The transmit end sends the first coded information on a first channel corresponding to the first to-be-coded information.

S103. The transmit end performs polarization coding on second to-be-coded information, to obtain second coded information with a bit sequence length of 2M, where the second to-be-coded information includes the first to-be-coded information, and differences between sequence numbers of information bits corresponding to the first to-be-coded information and sequence numbers of information bits at $(M+1)^{th}$ to $2M^{th}$ bit positions in information bits corresponding to the second to-be-coded information are sequentially M in ascending order of sequence numbers.

S104. The transmit end sends the second coded information on a second channel corresponding to the second to-be-coded information.

In one embodiment, the second to-be-coded information includes the first to-be-coded information. For example, the first to-be-coded information is group common DCI, the second to-be-coded information is UE-specific DCI, M is a target code length corresponding to the first to-be-coded information, and 2M is a target code length corresponding to the second to-be-coded information. When the transmit end separately performs polarization coding on the first to-be-coded information and the second to-be-coded information, S101 includes: The transmit end obtains the first to-be-coded information and a coded bit sequence length M. The transmit end determines bit positions of first frozen bits and bit positions of first information bits in the first to-be-coded information based on M. The transmit end determines bit values at the bit positions of the first frozen bits and bit values at the bit positions of the first information bits in the first to-be-coded information based on M, and performs polarization coding on all the determined bits. The transmit end obtains the first coded information with the bit sequence length of M, and then sends the first coded information on the first channel corresponding to the first to-be-coded information.

S103 includes: The transmit end obtains the second to-be-coded information and a coded bit sequence length 2M. The transmit end determines bit positions of second frozen bits and bit positions of second information bits in the second to-be-coded information based on 2M, and differences between sequence numbers of the second information bits at the $(M+1)^{th}$ to $2M^{th}$ bit positions and sequence numbers of the first information bits are sequentially M in ascending order of sequence numbers. The transmit end determines bit values at the bit positions of the second frozen bits and bit values at the bit positions of the second information bits in the second to-be-coded information based on 2M, and performs polarization coding on all the determined bits. In one embodiment, positions of the second information bits at the $(M+1)^{th}$ to $2M^{th}$ bit positions in the second to-be-coded information are the same as positions of the first information bits at first to $M^{th}$ bit positions in the first to-be-coded information. For example, M is 8. The sequence numbers of the first information bits are [2, 3, 5, 7], the sequence numbers of the second information bits at the $(M+1)^{th}$ to $2M^{th}$ bit positions are [10, 11, 13, 15], and the differences between the sequence numbers of the first information bits and the sequence numbers of the second information bits at the $(M+1)^{th}$ to $2M^{th}$ bit positions are sequentially M, namely, 8. The transmit end obtains the second coded information with the bit sequence length of 2M, and then sends the second coded information on the second channel corresponding to the second to-be-coded information.

It should be noted that there is no sequence between coding and sending of the first to-be-coded information and coding and sending of the second to-be-coded information, provided that a coded bit sequence meets the foregoing rule.

In one embodiment, in a feasible manner, that the transmit end determines bit positions of first frozen bits and bit positions of first information bits in the first to-be-coded information based on M includes: The transmit end obtains preset bit positions of the first frozen bits, and uses bit positions other than the bit positions of the first frozen bits as the bit positions of the first information bits. A bit sequence length obtained after the first to-be-coded information is coded is M, the bit positions of the first frozen bits are preset, and bit positions other than the bit positions of the first frozen bits in the M bit positions are the bit positions of the first information bits.

Correspondingly, that the transmit end determines bit positions of second frozen bits and bit positions of second information bits in the second to-be-coded information based on 2M includes: The transmit end obtains preset bit positions of the second frozen bits, and uses bit positions other than the bit positions of the second frozen bits as the bit positions of the second information bits, and differences between preset sequence numbers of the second frozen bits at the $(M+1)^{th}$ to $2M^{th}$ bit positions and preset sequence numbers of the first frozen bits are sequentially M in ascending order of sequence numbers. In this manner, the transmit end presets the bit positions of the first frozen bits and the bit positions of the second frozen bits, and the differences between the bit positions of the first frozen bits and the bit positions of the second frozen bits are sequentially M.

In a feasible manner, that the transmit end determines bit positions of first frozen bits and bit positions of first information bits in the first to-be-coded information based on M includes: The transmit end determines the bit positions of the first frozen bits and the bit positions of the first information bits in the first to-be-coded information based on M according to a first preset rule. In one embodiment, the transmit end determines the bit positions of the first information bits according to the first preset rule, and uses bit positions other than the bit positions of the first information bits as the bit positions of the first frozen bits based on M. For example, if a quantity of first information bits is K1, a quantity of first frozen bits is M−K, where a value of K1 may be determined based on a code rate R and the coded sequence length M, K1=M*R, and K1 may be alternatively an input value. Correspondingly, that the transmit end determines bit positions of second frozen bits and bit positions of second information bits in the second to-be-coded information based on 2M includes: The transmit end sequentially obtains, in ascending order, bit position sequence numbers of the second frozen bits at the $(M+1)^{th}$ to $2M^{th}$ bit positions by adding bit position sequence numbers of the first frozen bits by M, and sequentially obtains, in ascending order, bit position sequence numbers of the second information bits at the $(M+1)^{th}$ to $2M^{th}$ bit positions by adding bit position sequence numbers of the first information bits by M. Then, the transmit end determines the bit positions of the second frozen bits and the bit positions of the second information bits in first to $M^{th}$ bit positions according to a second preset rule. In one embodiment, the transmit end determines the bit positions of the second information bits in the first to $M^{th}$ bit positions according to the second preset rule, and uses bit positions other than the bit positions of the second information bits in the first to $M^{th}$ bit positions as the bit positions of the second frozen bits in the first to $M^{th}$ bit positions based on M. For example, if a quantity of second information bits in the first to $M^{th}$ bit positions is K2, a quantity of second frozen bits in the first to $M^{th}$ bit positions is M−K2. In this manner, the bit positions of the first information bits may be determined according to the first preset rule, and the bit positions of the second information bits in the first to $M^{th}$ bit positions may be determined according to the second preset rule. The first preset rule and the second preset rule may be the same, or may be different. For example, the first preset rule or the second preset rule may be: calculating reliability of a polarization channel based on a Gaussian approximation method or a density evolution method, or calculating reliability of a polarization channel based on a polarization weight of the polarization channel, to determine K bit positions with highest reliability as the bit positions of the first information bits, where K is a quantity of information bits.

Figure 3:
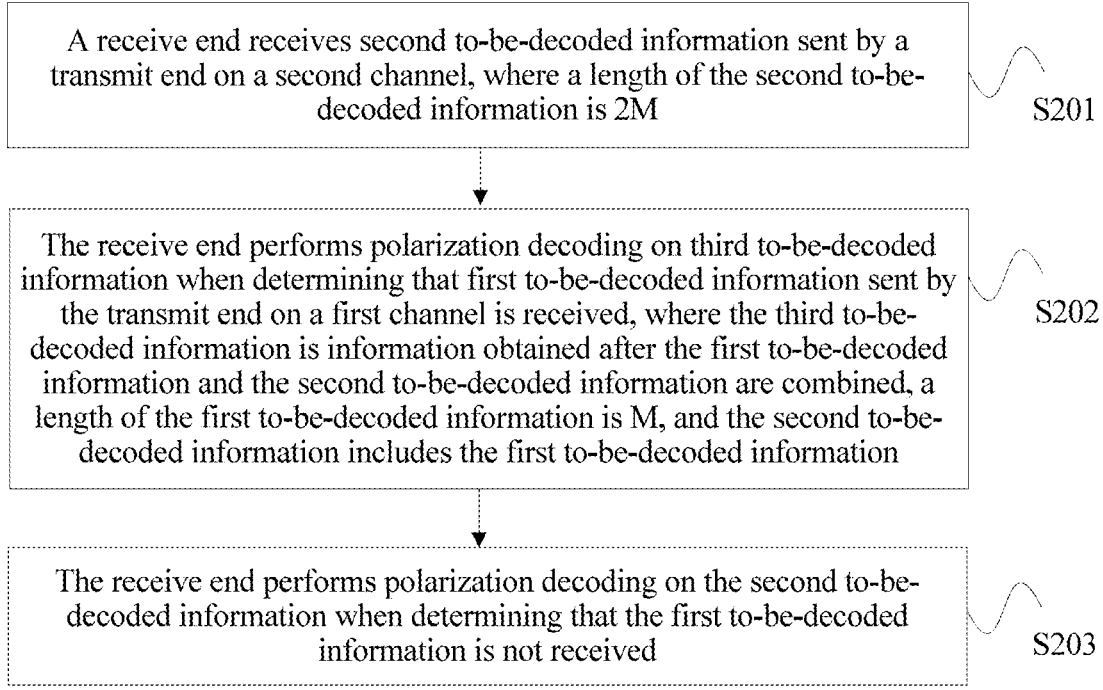
FIG. 3 is a flowchart of an embodiment of a decoding method according to this application.

On a decoder, FIG. 3 is a flowchart of an embodiment of a decoding method according to this application. As shown in FIG. 3, the method in this embodiment may include the following operations.

S201. A receive end receives second to-be-decoded information sent by a transmit end on a second channel, where a length of the second to-be-decoded information is 2M, and M is a positive integer.

In one embodiment, the second to-be-decoded information may be corresponding to second coded information of the transmit end, and first to-be-decoded information may be corresponding to first coded information of the transmit end.

In one embodiment, before S201, the method may further include the following operation:

The receive end receives first to-be-decoded information, and obtains a length M of the first to-be-decoded information.

S202. The receive end performs polarization decoding on third to-be-decoded information when determining that first to-be-decoded information sent by the transmit end on a first channel is received, where the third to-be-decoded information is information obtained after the first to-be-decoded information and the second to-be-decoded information are combined, and a length of the first to-be-decoded information is M.

In one embodiment, after receiving the first to-be-decoded information and the second to-be-decoded information, the receive end may combine the first to-be-decoded information and the second to-be-decoded information, to obtain the third to-be-decoded information. The third to-be-decoded information includes a first part and a second part, the first part is first to $M^{th}$ bit positions in the second to-be-decoded information, and the second part is a sum of first to $M^{th}$ bit positions in the first to-be-decoded information and $(M+1)^{th}$ to $2M^{th}$ bit positions in the second to-be-decoded information in sequence.

The performing polarization decoding on third to-be-decoded information includes: The receive end obtains a length 2M of the third to-be-decoded information. The receive end determines bit positions of second frozen bits and bit positions of second information bits in the third to-be-decoded information based on 2M. The receive end determines bit values at the bit positions of the second frozen bits and bit values at the bit positions of the second information bits, and performs polarization decoding on all the determined bits.

S203. The receive end performs polarization decoding on the second to-be-decoded information when determining that the first to-be-decoded information is not received.

The performing polarization decoding on the second to-be-decoded information includes: The receive end obtains the length 2M of the second to-be-decoded information. The receive end determines bit positions of first frozen bits and bit positions of first information bits in the second to-be-decoded information based on 2M. The receive end determines bit values at the bit positions of the first frozen bits and bit values at the bit positions of the first information bits, and performs polarization decoding on all the determined bits.

According to the coding method provided in this embodiment, when separately coding the first to-be-coded information and the second to-be-coded information, the transmit end codes the first to-be-coded information into a code word with a code length of M, and codes the second to-be-coded information into a code word with a code length of 2M. In addition, it is ensured that the differences between the sequence numbers of the information bits corresponding to the first to-be-coded information and the sequence numbers of the information bits at the $(M+1)^{th}$ to $2M^{th}$ bit positions in the information bits corresponding to the second to-be-coded information are sequentially M in ascending order of sequence numbers. Because the second to-be-coded information includes the first to-be-coded information, $(M+1)^{th}$ to $2M^{th}$ bits in a coded code word corresponding to the second to-be-coded information and a coded code word with the length of M corresponding to the first to-be-coded information are consistent. Because of such the consistency, when performing decoding, the receive end may combine the first to-be-coded information and the second to-be-coded information, and perform polarization decoding with the code length of 2M, to obtain the second to-be-coded information. Therefore, decoding performance can be improved.

The technical solutions of the method embodiments shown in FIG. 2 and FIG. 3 are described below in detail by using an embodiment.

In this embodiment, an example in which the second to-be-decoded information is UE-specific DCI, the first to-be-decoded information is group common DCI, the first channel is a group common PDCCH, and the second channel is a UE-specific PDCCH is used. It should be noted that in this embodiment, the UE-specific DCI and the group common DCI are merely used as examples, but do not constitute a limitation. This embodiment may be further applied to a scenario in which one piece of to-be-coded information is included in another piece of to-be-coded information. In this embodiment, the transmit end is, for example, a base station, and the receive end includes a scheduled terminal device and a non-scheduled terminal device.

Figure 4:
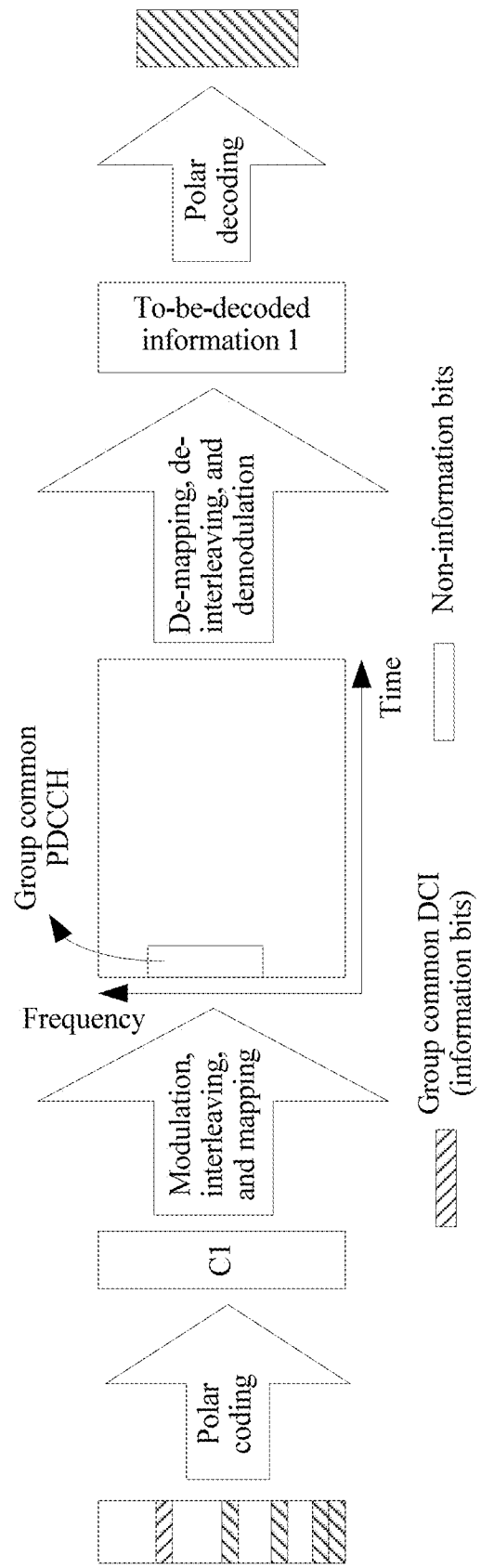
FIG. 4 is a schematic diagram of a process of coding and decoding group common DCI by a base station.

FIG. 4 is a schematic diagram of a process of coding and decoding group common DCI by a base station. As shown in FIG. 4, information bits and non-information bits in the group common DCI are first determined, and positions of the determined information bits are shown in FIG. 4. The base station performs polarization coding on the group common DCI to obtain first coded information C1 with a length of M, and then sends C1 on a group common PDCCH by performing operations such as modulation, interleaving, and mapping. A non-scheduled user receives the information on the group common PDCCH, obtains to-be-decoded information 1 by performing operations such as de-mapping, de-interleaving, and demodulation, and decodes the to-be-decoded information 1 to obtain the group common DCI.

Figure 5:
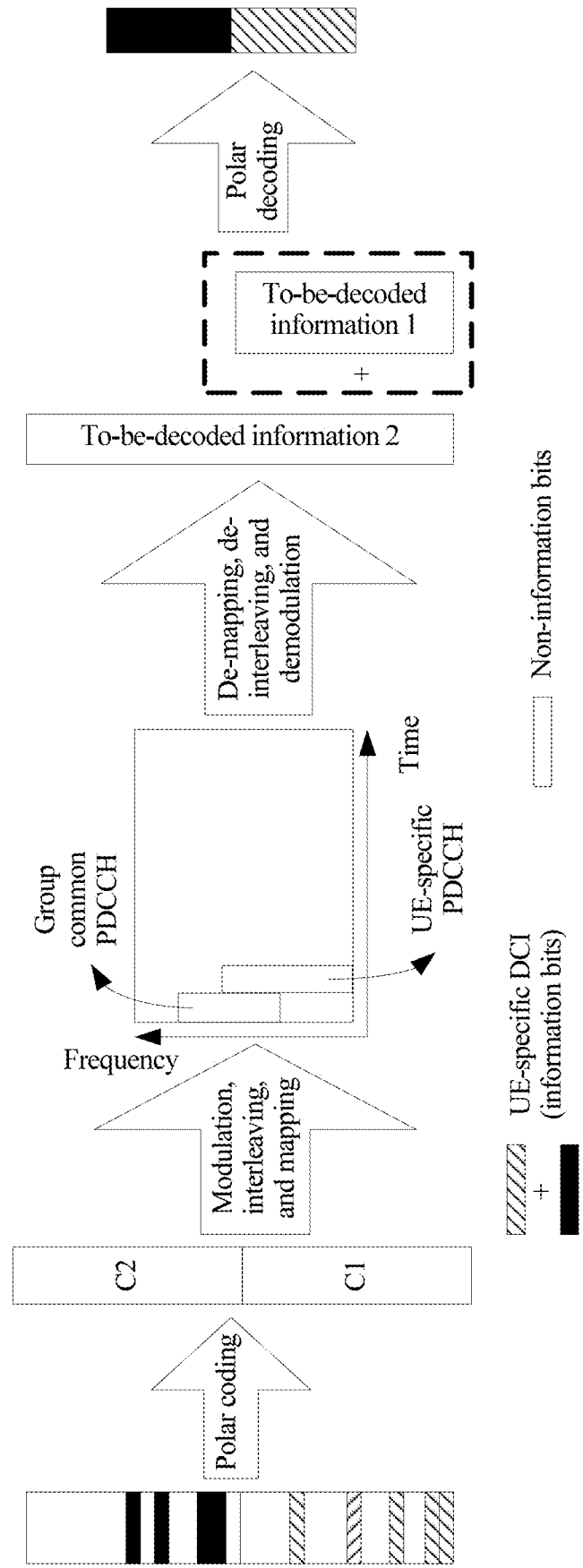
FIG. 5 is a schematic diagram of a process of coding and decoding UE-specific DCI by a base station.

FIG. 5 is a schematic diagram of a process of coding and decoding UE-specific DCI by a base station. As shown in FIG. 5, information bits and non-information bits in the UE-specific DCI are first determined, and positions of the determined information bits at $(M+1)^{th}$ to $2M^{th}$ bit positions are the same as positions of information bits in group common DCI, in other words, differences between sequence numbers of the information bits corresponding to the group common DCI and sequence numbers of the information bits at the $(M+1)^{th}$ to $2M^{th}$ bit positions in information bits corresponding to the UE-specific DCI are sequentially M in ascending order of sequence numbers. The base station performs polarization coding on the UE-specific DCI to obtain cascading of C1 and C2 and obtain the second coded information C1 and the second coded information C2 with a length of 2M, and then sends C1 and C2 on a UE-specific PDCCH by performing operations such as modulation, interleaving, and mapping. If a scheduled user receives the information on the group common PDCCH, the scheduled user obtains to-be-decoded information 1 by performing operations such as de-mapping, de-interleaving, and demodulation on the information. If the scheduled user does not receive the group common PDCCH, the scheduled user does not perform such the operation. If the scheduled user receives the information on the UE-specific PDCCH, the scheduled user obtains to-be-decoded information 2 by performing operations such as de-mapping, de-interleaving, and demodulation. If the scheduled user obtains the to-be-decoded information 1, the scheduled user combines the to-be-decoded information 1 and the to-be-decoded information 2, and sends the to-be-decoded information 1 and the to-be-decoded information 2 to a polar decoder for decoding, to obtain the UE-specific DCI. If the scheduled user does not obtain the to-be-decoded information 1, the scheduled user directly performs polar decoding on the to-be-decoded information 2, to obtain the UE-specific DCI. Same information between the group common DCI and the UE-specific DCI is used in a coding process, so that decoding performance can be improved.

How to combine the to-be-decoded information 1 and the to-be-decoded information 2 is described below from a perspective of a polar coding principle with reference to FIG. 6. FIG. 6 is a schematic diagram of a process of jointly coding group common DCI and UE-specific DCI. FIG. 7 is a schematic diagram of a polarization operation. As shown in FIG. 6, in a polar code coding process, generating one long code is equivalent to performing one-time polarization operation shown in FIG. 7 on two half-length short codes. Therefore, it is assumed that a code length obtained after the UE-specific DCI is coded is 2M, provided that some overlapping bits of the group common DCI and the UE-specific DCI are placed at information bit positions in $(M+1)^{th}$ to $2M^{th}$ bit positions before the polar coding, and the remaining bits in the UE-specific DCI are placed at information bit positions in first to $M^{th}$ bit positions before the polar coding. In addition, when the group common DCI is coded, the group common DCI is coded into a code word with a code length of M in a manner of placing information bits at the $(M+1)^{th}$ to $2M^{th}$ bit positions when the UE-specific DCI is coded. Therefore, $(M+1)^{th}$ to $2M^{th}$ bits in a code word obtained after the UE-specific DCI is coded and a code word with a length of M into which the group common DCI is individually coded are consistent. Because of such the consistency, the receive end may combine the group common DCI and the UE-specific DCI, so that coding and decoding performance can be improved.

In an LTE system, a base station individually codes and modulates each piece of DCI, and also individually demodulates and decodes each piece of DCI at a receive end. Therefore, same information between different DCI cannot be used. This application further provides a coding and decoding method, so that same information between different to-be-decoded information can be used to assist in decoding at a receive end, thereby improving decoding performance. The following describes the technical solutions in detail with reference to the accompanying drawings. In the solutions, the transmit end still separately codes different to-be-coded information, and uses same information between different to-be-decoded information to assist in decoding at the receive end. The following describes a decoding process in detail with reference to FIG. 8.

FIG. 8 is a flowchart of an embodiment of another decoding method according to this application. As shown in FIG. 8, the method in this embodiment may include the following operations.

S301. A receive end receives first to-be-decoded information sent by a transmit end on a first channel, and performs polarization decoding on the first to-be-decoded information, to obtain first decoded information.

S302. The receive end receives second to-be-decoded information sent by the transmit end on a second channel, and when the receive end determines that the first to-be-decoded information is correctly decoded, the receive end performs polarization decoding on the second to-be-decoded information by using the first decoded information, to obtain second decoded information, where the second decoded information and the first decoded information include same first information.

The same first information included in the second decoded information and the first decoded information may be all of the first decoded information, or may be a part of the first decoded information. Polarization decoding is performed on the second to-be-decoded information by using the first decoded information, in other words, the first decoded information is used to assist in decoding the second to-be-decoded information.

In one embodiment, the receive end performs polarization decoding on the second to-be-decoded information by using the first decoded information includes: determining values of known bits based on the first decoded information and a preset position of the first information in the second decoded information, where the known bits are bits at the position of the first information, and the known bits include at least one bit; and performing path selection in a decoding process based on the values of the known bits; or performing early stop in a decoding process based on the values of the known bits; or performing path selection and early stop in a decoding process based on the values of the known bits according to a preset rule.

The performing path selection in a decoding process based on the values of the known bits includes: when a first bit in the known bits in the second to-be-decoded information is decoded, if a log-likelihood ratio of the first bit matches a value of the first bit, skipping increasing or increasing a path metric to a first preset value, or if a log-likelihood ratio of the first bit matches a value of the first bit, increasing a path metric to a second preset value, where the second preset value is at least 10 times greater than the first preset value, and matching means that a symbol of the log-likelihood ratio is the same as a symbol indicated by the value of the known bit; sorting all current paths based on path metrics, and deleting half of the paths with a larger path metric; and when another bit in the known bits is decoded, performing a same decoding operation.

The performing early stop in an SCL decoding process based on the values of the known bits includes:

when a first bit in the known bits in the second to-be-decoded information is decoded, if a determining result of a log-likelihood ratio of the first bit is not equal to a value of the first bit, marking current paths; and stopping decoding when it is determined that all the current paths are marked; or continuing decoding when it is determined that there is an unmarked path in all the current paths, and when another bit in the known bits is decoded, performing a same decoding operation.

The known bits are distributed between an $n^{th}$ bit and an $(n+m)^{th}$ bit, n and m are positive integers, and when path selection and early stop in a decoding process are performed based on the values of the known bits according to the preset rule, the preset rule may be: performing early stop in a decoding process on known bits distributed between the $n^{th}$ bit and an $(n+k)^{th}$ bit, where k is a positive integer less than m, and performing path selection in a decoding process on known bits distributed between an $(n+k+1)^{th}$ bit and the $(n+m)^{th}$ bit; or performing path selection in a decoding process on known bits distributed between the $n^{th}$ bit and an $(n+k)^{th}$ bit, and performing early stop in a decoding process on known bits distributed between an $(n+k+1)^{th}$ bit and the $(n+m)^{th}$ bit; or alternately performing early stop and path selection in a decoding process on the known bits distributed between the $n^{th}$ bit and the $(n+m)^{th}$ bit based on a preset quantity of intervals.

According to the decoding method provided in this embodiment, same information between different to-be-decoded information is used to assist in decoding at the receive end, so that decoding performance can be improved.

The technical solutions in the method embodiment shown in FIG. 8 are described below in detail by using an embodiment.

In this embodiment, an example in which the second to-be-decoded information is UE-specific DCI, the first to-be-decoded information is group common DCI, the first channel is a group common PDCCH, and the second channel is a UE-specific PDCCH is used. It should be noted that in this embodiment, the UE-specific DCI and the group common DCI are merely used as examples, but do not constitute a limitation. This embodiment may be further applied to a scenario in which two pieces of to-be-coded information include same information. In this embodiment, the transmit end is, for example, a base station, and the receive end includes a scheduled terminal device and a non-scheduled terminal device.

In this embodiment, when a DCI format is designed, a position of the group common DCI in the UE-specific DCI or a position of same information between the group common DCI and the UE-specific DCI in the UE-specific DCI is determined. A determining method may be preset.

Figure 9:
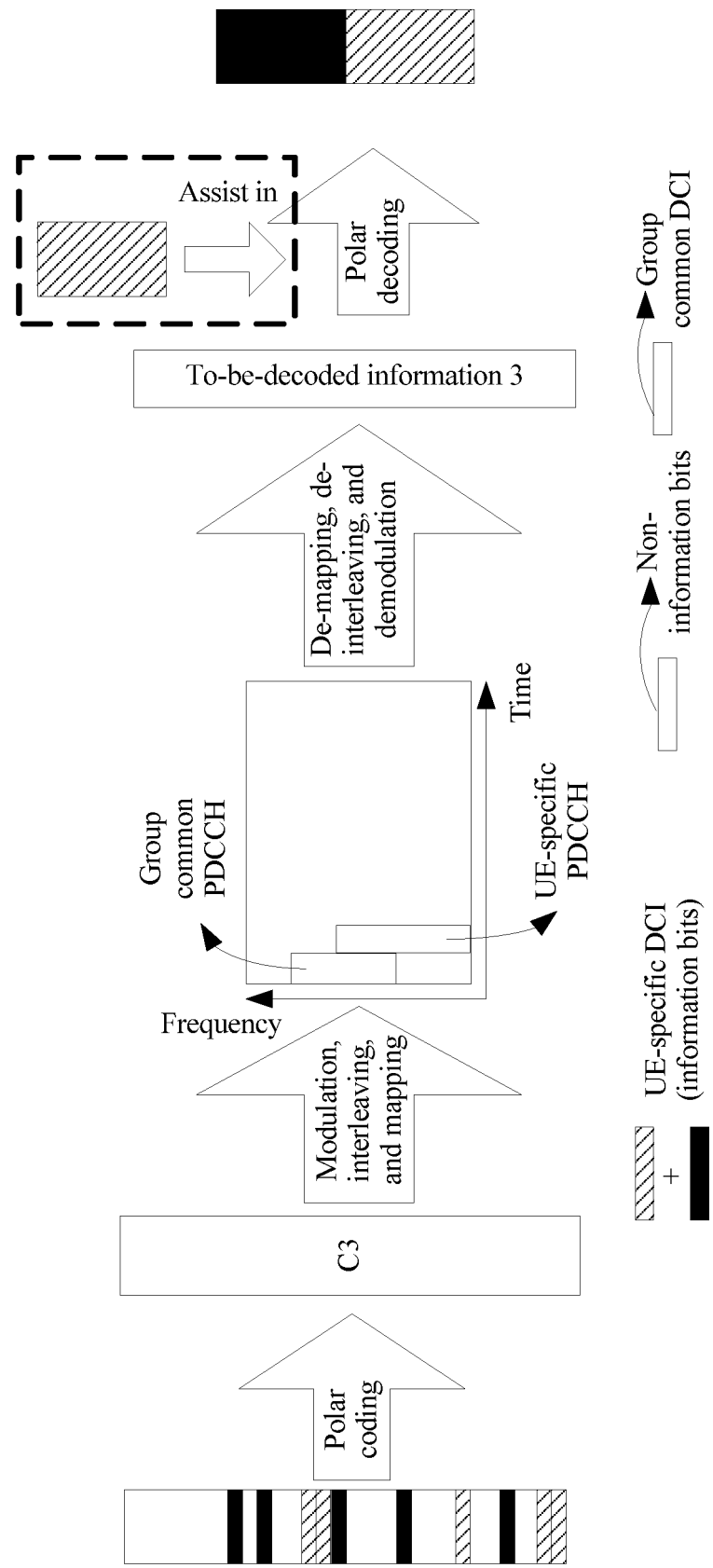
FIG. 9 is a schematic diagram of a process of coding and decoding UE-specific DCI by a base station.

A process of coding and decoding the group common DCI by the base station is the same as that in FIG. 4. For details, refer to FIG. 4 and the corresponding descriptions. Details are not described herein again. FIG. 9 is a schematic diagram of a process of coding and decoding UE-specific DCI by a base station. As shown in FIG. 9, the base station performs independent polar coding on the UE-specific DCI, to obtain third coded information C4. The base station sends the third coded information C4 on the group common PDCCH by performing operations such as modulation, interleaving, and mapping. A scheduled user may receive the information on the group common PDCCH, obtain to-be-decoded information 1 by performing operations such as de-mapping, de-interleaving, and demodulation, and decode the to-be-decoded information 1 to obtain the group common DCI. The scheduled user receives the information on the UE-specific PDCCH, obtains to-be-decoded information 3 by performing operations such as de-mapping, de-interleaving, and demodulation, and performs polar code decoding on the to-be-decoded information 3. If the scheduled user has successfully decoded the group common DCI, the scheduled user obtains, based on a preset position of same information between the group common DCI and the UE-specific DCI in the UE-specific DCI, bits corresponding to the same information, and may assist in decoding by using the bits corresponding to the same information when decoding the to-be-decoded information 3. If the scheduled user does not receive the group common PDCCH or fails to decode the group common DCI, the scheduled user directly performs polar code decoding on the to-be-decoded information 3.

In one embodiment, the receive end assists in decoding by using the bits corresponding to the same information includes:

determining values of known bits based on the group common DCI and a preset position of same information between the group common DCI and the UE-specific DCI in the UE-specific DCI, where the known bits are bits at the position of the same information between the group common DCI and the UE-specific DCI, and the known bits include at least one bit; and then, performing path selection in a decoding process based on the values of the known bits; or performing early stop in a decoding process based on the values of the known bits; or performing path selection and early stop in a decoding process based on the values of the known bits according to a preset rule.

Figure 10:
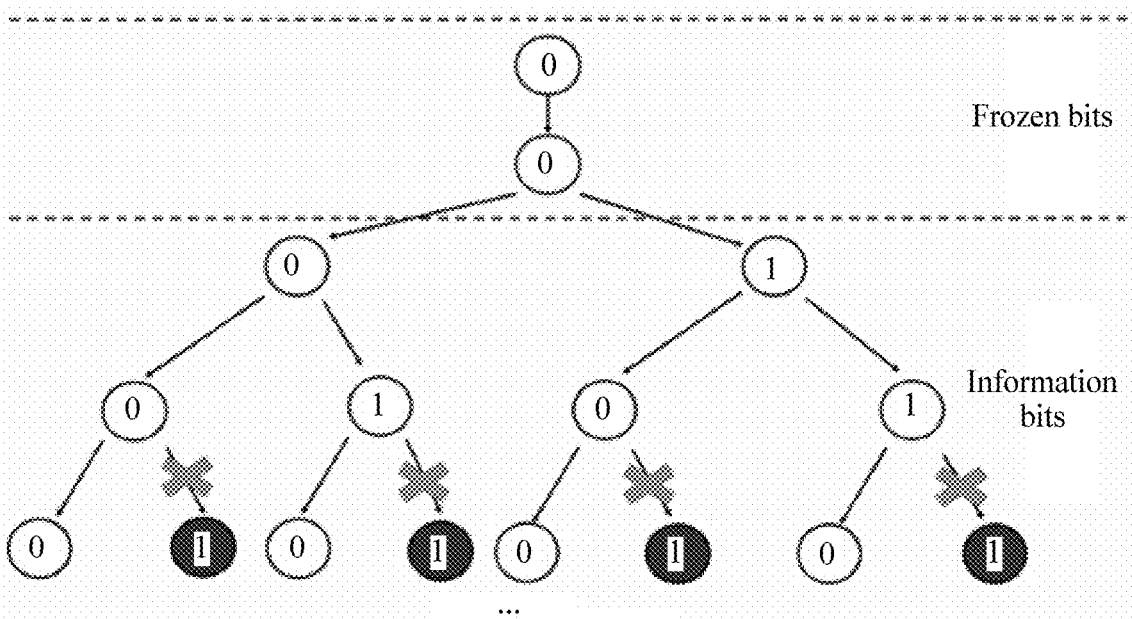
FIG. 10 is a schematic diagram of performing path selection in a decoding process based on values of known bits.

FIG. 10 is a schematic diagram of performing path selection in a decoding process based on values of known bits. As shown in FIG. 10, when a first bit in the known bits in to-be-decoded information 3 is decoded, if a log-likelihood ratio of the first bit matches a value of the first bit, a path metric is not increased or increased to a first preset value, or if a log-likelihood ratio of the first bit matches a value of the first bit, a path metric is increased to a second preset value. The second preset value is at least 10 times greater than the first preset value, and matching means that a symbol of the log-likelihood ratio is the same as a symbol indicated by the value of the known bit. All current paths are sorted based on path metrics, and half of the paths with a larger path metric are deleted. When another bit in the known bits is decoded, a same decoding operation is performed. It is assumed that a fifth bit in UE-specific DCI is a bit that is the same as that in group common DCI, and it is learned, by decoding the group common DCI, that the bit should be 0. Therefore, in a process of decoding the UE-specific DCI, when the fifth bit is decoded, if an LLR (5) is consistent with 0, a path metric of the path is not increased or increased to the first preset value. If the LLR (5) is inconsistent with 1, the path metric of the path is increased to the second preset value. It is assumed that successive cancellation list decoding (Successive Cancellation List decoding, SCL) with a quantity of paths of 4 is performed. Therefore, after the fifth bit is decoded, all eight paths are sorted based on path metrics, and four paths with a larger path metric are deleted. In this way, four paths on which a value of a fifth bit is 1 are deleted because a penalty value is greatly increased, in other words, path selection is implemented.

Figure 11:
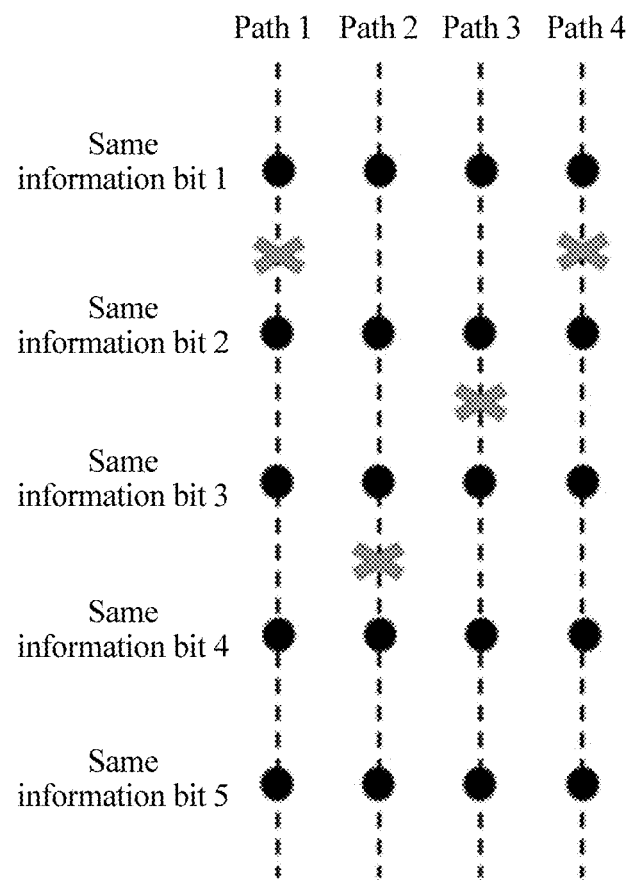
FIG. 11 is a schematic diagram of performing early stop in a decoding process based on values of known bits.

FIG. 11 is a schematic diagram of performing early stop in a decoding process based on values of known bits. As shown in FIG. 11, when a first bit in the known bits in to-be-decoded information 3 is decoded, if a determining result of a log-likelihood ratio of the first bit is not equal to a value of the first bit, current paths are marked. Decoding is stopped when it is determined that all the current paths are marked. Alternatively, decoding is continued when it is determined that there is an unmarked path in all the current paths, and when another bit in the known bits is decoded, a same decoding operation is performed. FIG. 11 is used as an example, and SCL decoding with a quantity of paths of 4 is performed. A path 1 and a path 4 are marked after a same information bit 1 is decoded, and a path 3 is marked after a same information bit 2 is decoded, and a path 2 is marked after a same information bit 3 is decoded. In this case, all the four paths are marked, and decoding is stopped.

In this embodiment, the known bits are used to assist in polar code decoding, and the known bits are used for early stop, so as to reduce a computing amount, and reduce decoding latency and power consumption. The known bits are used for path selection, so as to improve decoding performance, for example, reduce a packet error rate.

In this application, the transmit end and the receive end may be divided into function modules based on the foregoing method examples. For example, each function module may be obtained through division for a corresponding function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 12:
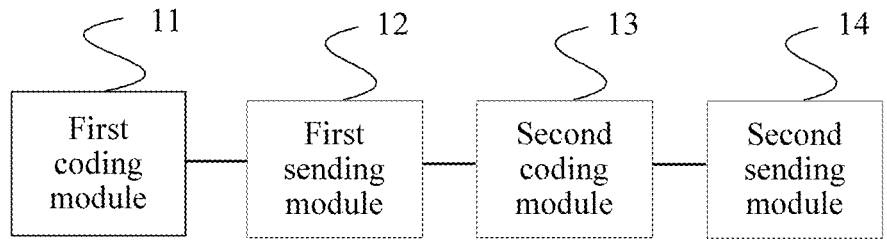
FIG. 12 is a schematic structural diagram of an embodiment of a coding apparatus according to this application.

FIG. 12 is a schematic structural diagram of an embodiment of a coding apparatus according to this application. As shown in FIG. 12, the apparatus in this embodiment may include a first coding module 11, a first sending module 12, a second coding module 13, and a second sending module 14. The first coding module 11 is configured to perform polarization coding on first to-be-coded information, to obtain first coded information with a bit sequence length of M, where M is a positive integer. The first sending module 12 is configured to send the first coded information on a first channel corresponding to the first to-be-coded information. The second coding module 13 is configured to perform polarization coding on second to-be-coded information, to obtain second coded information with a bit sequence length of 2M, where the second to-be-coded information includes the first to-be-coded information, and differences between sequence numbers of information bits corresponding to the first to-be-coded information and sequence numbers of information bits at $(M+1)^{th}$ to $2M^{th}$ bit positions in information bits corresponding to the second to-be-coded information are sequentially M in ascending order of sequence numbers. The second sending module 14 is configured to send the second coded information on a second channel corresponding to the second to-be-coded information.

In one embodiment, the first coding module 11 is configured to: obtain the first to-be-coded information and a coded bit sequence length M; determine bit positions of first frozen bits and bit positions of first information bits in the first to-be-coded information based on M; and determine bit values at the bit positions of the first frozen bits and bit values at the bit positions of the first information bits, and perform polarization coding on all the determined bits.

In one embodiment, the second coding module 13 is configured to: obtain the second to-be-coded information and a coded bit sequence length 2M; determine bit positions of second frozen bits and bit positions of second information bits in the second to-be-coded information based on 2M, where differences between sequence numbers of the second information bits at the $(M+1)^{th}$ to $2M^{th}$ bit positions and sequence numbers of the first information bits are sequentially M in ascending order of sequence numbers; and determine bit values at the bit positions of the second frozen bits and bit values at the bit positions of the second information bits, and perform polarization coding on all the determined bits.

In one embodiment, the first coding module 11 is configured to: obtain preset bit positions of the first frozen bits, and use bit positions other than the bit positions of the first frozen bits as the bit positions of the first information bits; and the second coding module 13 is configured to: obtain preset bit positions of the second frozen bits, and use bit positions other than the bit positions of the second frozen bits as the bit positions of the second information bits, where differences between preset sequence numbers of the second frozen bits at the $(M+1)^{th}$ to $2M^{th}$ bit positions and preset sequence numbers of the first frozen bits are sequentially M in ascending order of sequence numbers.

In one embodiment, the first coding module 11 is configured to determine the bit positions of the first frozen bits and the bit positions of the first information bits in the first to-be-coded information based on M according to a first preset rule; and the second coding module 13 is configured to: sequentially obtain, in ascending order, bit position sequence numbers of the second frozen bits at the $(M+1)^{th}$ to $2M^{th}$ bit positions by adding bit position sequence numbers of the first frozen bits by M, and sequentially obtain, in ascending order, bit position sequence numbers of the second information bits at the $(M+1)^{th}$ to $2M^{th}$ bit positions by adding bit position sequence numbers of the first information bits by M; and determine the bit positions of the second frozen bits and the bit positions of the second information bits in first to $M^{th}$ bit positions according to a second preset rule.

The apparatus in this embodiment may be used to execute the technical solutions of the method embodiment shown in FIG. 2. The implementation principles and technical effects are similar, and are not further described herein.

Figure 13:
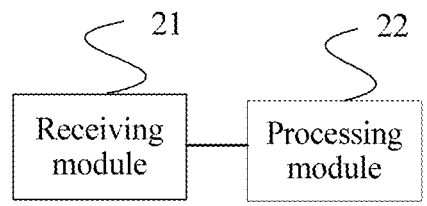
FIG. 13 is a schematic structural diagram of an embodiment of a decoding apparatus according to this application.

FIG. 13 is a schematic structural diagram of an embodiment of a decoding apparatus according to this application. As shown in FIG. 13, the apparatus in this embodiment may include a receiving module 21 and a processing module 22. The receiving module 21 is configured to receive second to-be-decoded information sent by a transmit end on a second channel, where a length of the second to-be-decoded information is 2M, and M is a positive integer. The processing module 22 is configured to: perform polarization decoding on third to-be-decoded information when determining that first to-be-decoded information sent by the transmit end on a first channel is received, where the third to-be-decoded information is information obtained after the first to-be-decoded information and the second to-be-decoded information are combined, and a length of the first to-be-decoded information is M; and perform polarization decoding on the second to-be-decoded information when determining that the first to-be-decoded information is not received.

Further, the receiving module 21 is further configured to: before receiving the second to-be-decoded information sent by the transmit end on the second channel, receive the first to-be-decoded information, and obtain the length M of the first to-be-decoded information.

The third to-be-decoded information includes a first part and a second part, the first part is first to $M^{th}$ bit positions in the second to-be-decoded information, and the second part is a sum of first to $M^{th}$ bit positions in the first to-be-decoded information and $(M+1)^{th}$ to $2M^{th}$ bit positions in the second to-be-decoded information in sequence.

In one embodiment, the processing module 22 is configured to: obtain the length 2M of the second to-be-decoded information; determine bit positions of first frozen bits and bit positions of first information bits in the second to-be-decoded information based on 2M; and determine bit values at the bit positions of the first frozen bits and bit values at the bit positions of the first information bits, and perform polarization decoding on all the determined bits.

In one embodiment, the processing module 22 is configured to: obtain a length 2M of the third to-be-decoded information; determine bit positions of second frozen bits and bit positions of second information bits in the third to-be-decoded information based on 2M; and determine bit values at the bit positions of the second frozen bits and bit values at the bit positions of the second information bits, and perform polarization decoding on all the determined bits.

The apparatus in this embodiment may be used to execute the technical solutions of the method embodiment shown in FIG. 3. The implementation principles and technical effects are similar, and are not further described herein.

Figure 14:
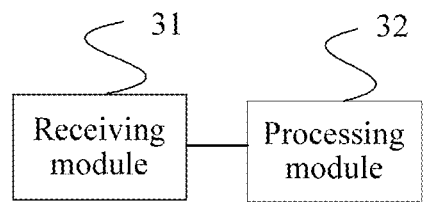
FIG. 14 is a schematic structural diagram of an embodiment of another decoding apparatus according to this application.

FIG. 14 is a schematic structural diagram of an embodiment of another decoding apparatus according to this application. As shown in FIG. 14, the apparatus in this embodiment may include a receiving module 31 and a processing module 32. The receiving module 31 is configured to: receive first to-be-decoded information sent by a transmit end on a first channel, and perform polarization decoding on the first to-be-decoded information, to obtain first decoded information. The processing module 32 is configured to: when determining that the first to-be-decoded information is correctly decoded, receive second to-be-decoded information sent by the transmit end on a second channel, and perform polarization decoding on the second to-be-decoded information by using the first decoded information, to obtain second decoded information, where the second decoded information and the first decoded information include same first information.

In one embodiment, the processing module 32 is configured to: determine values of known bits based on the first decoded information and a preset position of the first information in the second decoded information, where the known bits are bits at the position of the first information, and the known bits include at least one bit; and perform path selection in a decoding process based on the values of the known bits; or perform early stop in a decoding process based on the values of the known bits; or perform path selection and early stop in a decoding process based on the values of the known bits according to a preset rule.

Further, the processing module 32 is configured to: when a first bit in the known bits in the second to-be-decoded information is decoded, if a log-likelihood ratio of the first bit matches a value of the first bit, skip increasing or increase a path metric to a first preset value, or if a log-likelihood ratio of the first bit matches a value of the first bit, increase a path metric to a second preset value, where the second preset value is at least 10 times greater than the first preset value, and matching means that a symbol of the log-likelihood ratio is the same as a symbol indicated by the value of the known bit; sort all current paths based on path metrics, and delete half of the paths with a larger path metric; and when another bit in the known bits is decoded, perform a same decoding operation.

Further, the processing module 32 is configured to: when a first bit in the known bits in the second to-be-decoded information is decoded, if a determining result of a log-likelihood ratio of the first bit is not equal to a value of the first bit, mark current paths; and stop decoding when it is determined that all the current paths are marked; or continue decoding when it is determined that there is an unmarked path in all the current paths, and when another bit in the known bits is decoded, perform a same decoding operation.

The known bits are distributed between an $n^{th}$ bit and an $(n+m)^{th}$ bit, n and m are positive integers, and the preset rule is: performing early stop in a decoding process on known bits distributed between the $n^{th}$ bit and an $(n+k)^{th}$ bit, where k is a positive integer less than m, and performing path selection in a decoding process on known bits distributed between an $(n+k+1)^{th}$ bit and the $(n+m)^{th}$ bit; or performing path selection in a decoding process on known bits distributed between the $n^{th}$ bit and an $(n+k)^{th}$ bit, and performing early stop in a decoding process on known bits distributed between an $(n+k+1)^{th}$ bit and the $(n+m)^{th}$ bit; or alternately performing early stop and path selection in a decoding process on the known bits distributed between the $n^{th}$ bit and the $(n+m)^{th}$ bit based on a preset quantity of intervals.

The apparatus in this embodiment may be used to execute the technical solutions of the method embodiment shown in FIG. 8. The implementation principles and technical effects are similar, and are not further described herein.

Figure 15:
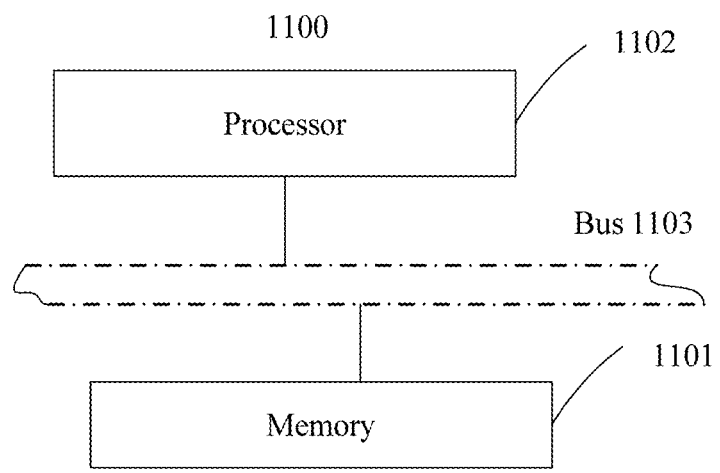
FIG. 15 is a schematic diagram of a coding apparatus according to this application.

FIG. 15 is a schematic diagram of a coding apparatus according to this application. The apparatus 1100 includes:

a memory 1101, configured to store a program instruction, where the memory may be a flash; and a processor 1102, configured to invoke and execute the program instruction in the memory, to implement the operations in the coding method shown in FIG. 2. For details, refer to the related descriptions in the foregoing method embodiment.

In one embodiment, the memory 1101 may be independent, or may be integrated with the processor 1102.

When the memory 1101 is a component independent of the processor 1102, the apparatus 1100 may further include:

a bus 1103, configured to connect the memory and the processor. The coding apparatus in FIG. 15 may further include a transmitter (which is not shown in the figure), configured to send a coded sequence obtained after the processor 1102 performs polar coding.

Figure 16:
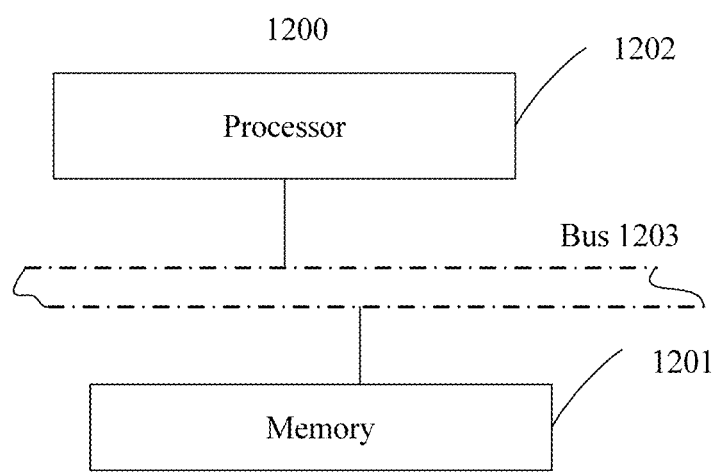
FIG. 16 is a schematic diagram of a decoding apparatus according to this application.

FIG. 16 is a schematic diagram of a decoding apparatus according to this application. The apparatus 1200 includes:

a memory 1201, configured to store an executable instruction, where the memory may be a flash; and a processor 1202, configured to execute the executable instruction stored in the memory, to implement the operations in the decoding method shown in FIG. 3 or FIG. 8. For details, refer to the related descriptions in the foregoing method embodiment.

In one embodiment, the memory 1201 may be independent, or may be integrated with the processor 1202.

When the memory 1201 is a component independent of the processor 1202, the apparatus 1200 may further include:

a bus 1203, configured to connect the memory and the processor.

The decoding apparatus in FIG. 16 may further include a receiver (which is not shown in the figure), configured to: receive to-be-decoded information, and send the to-be-decoded information to the processor 1202.

This application further provides a readable storage medium. The readable storage medium stores an executable instruction, and when at least one processor of a coding apparatus executes the executable instruction, the coding apparatus performs the coding method provided in the foregoing embodiments.

This application further provides a readable storage medium. The readable storage medium stores an executable instruction, and when at least one processor of a decoding apparatus executes the executable instruction, the decoding apparatus performs the decoding method provided in the foregoing embodiments.

This application further provides a program product. The program product includes an executable instruction, and the executable instruction is stored in a readable storage medium. At least one processor of a coding apparatus may read the executable instruction from the readable storage medium, and the at least one processor executes the executable instruction, so that the coding apparatus is enabled to implement the coding method provided in the foregoing embodiments.

This application further provides a program product. The program product includes an executable instruction, and the executable instruction is stored in a readable storage medium. At least one processor of a decoding apparatus may read the executable instruction from the readable storage medium, and the at least one processor executes the executable instruction, so that the decoding apparatus is enabled to implement the decoding method provided in the foregoing embodiments.

A person of ordinary skill in the art may understand that all or some of the operations of the method embodiments may be implemented by a program instructing related hardware. The program may be stored in a computer-readable storage medium. When the program runs, the operations of the method embodiments are performed. The foregoing storage medium includes: any medium that can store program code, such as a ROM, a RAM, a magnetic disk, or an optical disc.

The invention claimed is:

1. A coding method comprising:
performing, by a transmit end, polarization coding on first to-be-coded information, to obtain first coded information with a bit sequence length of M, wherein M is a positive integer;
sending, by the transmit end, the first coded information on a first channel corresponding to the first to-be-coded information;
performing, by the transmit end, polarization coding on second to-be-coded information, to obtain second coded information with a bit sequence length of 2M, wherein the second to-be-coded information comprises the first to-be-coded information, and differences between sequence numbers of information bits corresponding to the first to-be-coded information and sequence numbers of information bits at $(M+1)^{th}$ to $2M^{th}$ bit positions in information bits corresponding to the second to-be-coded information are sequentially M in ascending order of sequence numbers; and
sending, by the transmit end, the second coded information on a second channel corresponding to the second to-be-coded information.

2. The method according to claim 1, wherein the performing, by a transmit end, polarization coding on first to-be-coded information comprises:
obtaining, by the transmit end, the first to-be-coded information and a coded bit sequence length M;
determining, by the transmit end, bit positions of first frozen bits and bit positions of first information bits in the first to-be-coded information based on M; and
determining, by the transmit end, bit values at the bit positions of the first frozen bits and bit values at the bit positions of the first information bits, and performing polarization coding on all the determined bit values.

3. The method according to claim 2, wherein the performing, by the transmit end, polarization coding on second to-be-coded information, to obtain second coded information with a bit sequence length of 2M comprises:
obtaining, by the transmit end, the second to-be-coded information and a coded bit sequence length 2M;
determining, by the transmit end, bit positions of second frozen bits and bit positions of second information bits in the second to-be-coded information based on 2M, wherein differences between sequence numbers of the second information bits at the $(M+1)^{th}$ to $2M^{th}$ bit positions and sequence numbers of the first information bits are sequentially M in ascending order of sequence numbers; and
determining, by the transmit end, bit values at the bit positions of the second frozen bits and bit values at the bit positions of the second information bits, and performing polarization coding on all the determined bit values.

4. The method according to claim 3, wherein the determining, by the transmit end, bit positions of first frozen bits and bit positions of first information bits in the first to-be-coded information based on M comprises:
obtaining, by the transmit end, preset bit positions of the first frozen bits, and using bit positions other than the preset bit positions of the first frozen bits as the bit positions of the first information bits; and
the determining, by the transmit end, bit positions of second frozen bits and bit positions of second information bits in the second to-be-coded information based on 2M comprises:
obtaining, by the transmit end, preset bit positions of the second frozen bits, and using bit positions other than the preset bit positions of the second frozen bits as the bit positions of the second information bits, wherein differences between preset sequence numbers of the second frozen bits at the $(M+1)^{th}$ to $2M^{th}$ bit positions and preset sequence numbers of the first frozen bits are sequentially M in ascending order of sequence numbers.

5. The method according to claim 3, wherein the determining, by the transmit end, bit positions of first frozen bits and bit positions of first information bits in the first to-be-coded information based on M comprises:
determining, by the transmit end, the bit positions of the first frozen bits and the bit positions of the first information bits in the first to-be-coded information based on M according to a first preset rule; and
the determining, by the transmit end, bit positions of second frozen bits and bit positions of second information bits in the second to-be-coded information based on 2M comprises:
sequentially obtaining, by the transmit end in ascending order, bit position sequence numbers of the second frozen bits at the $(M+1)^{th}$ to $2M^{th}$ bit positions by adding bit position sequence numbers of the first frozen bits by M, and sequentially obtaining, in ascending order, bit position sequence numbers of the second information bits at the $(M+1)^{th}$ to $2M^{th}$ bit positions by adding bit position sequence numbers of the first information bits by M; and determining, by the transmit end, the bit positions of the second frozen bits and the bit positions of the second information bits in first to $M^{th}$ bit positions according to a second preset rule.

6. A decoding method comprising:

receiving, by a receive end, second to-be-decoded information sent by a transmit end on a second channel, wherein a length of the second to-be-decoded information is 2M, and M is a positive integer;

performing, by the receive end, polarization decoding on third to-be-decoded information when determining that first to-be-decoded information sent by the transmit end on a first channel is received, wherein the third to-be-decoded information is information obtained after the first to-be-decoded information and the second to-be-decoded information are combined, and a length of the first to-be-decoded information is M; and performing, by the receive end, polarization decoding on the second to-be-decoded information when determining that the first to-be-decoded information is not received.

7. The method according to claim 6, wherein, before the receiving, by a receive end, second to-be-decoded information sent by a transmit end on a second channel, further comprising:

receiving, by the receive end, the first to-be-decoded information, and obtaining the length M of the first to-be-decoded information.

8. The method according to claim 6, wherein the third to-be-decoded information comprises a first part and a second part, the first part is first to $M^{th}$ bit positions in the second to-be-decoded information, and the second part is a sum of first to $M^{th}$ bit positions in the first to-be-decoded information and $(M+1)^{th}$ to $2M^{th}$ bit positions in the second to-be-decoded information in sequence.

9. The method according to claim 6, wherein the performing polarization decoding on the second to-be-decoded information comprises:

obtaining, by the receive end, the length 2M of the second to-be-decoded information;

determining, by the receive end, bit positions of first frozen bits and bit positions of first information bits in the second to-be-decoded information based on 2M; and determining, by the receive end, bit values at the bit positions of the first frozen bits and bit values at the bit positions of the first information bits, and performing polarization decoding on all the determined bit values.

10. The method according to claim 6, wherein the performing polarization decoding on third to-be-decoded information comprises:

obtaining, by the receive end, a length 2M of the third to-be-decoded information;

determining, by the receive end, bit positions of second frozen bits and bit positions of second information bits in the third to-be-decoded information based on 2M; and determining, by the receive end, bit values at the bit positions of the second frozen bits and bit values at the bit positions of the second information bits, and performing polarization decoding on all the determined bit values.

11. A coding apparatus comprising:

a first coding module configured to perform polarization coding on first to-be-coded information, to obtain first coded information with a bit sequence length of M, wherein M is a positive integer;

a first sending module configured to send the first coded information on a first channel corresponding to the first to-be-coded information;

a second coding module configured to perform polarization coding on second to-be-coded information, to obtain second coded information with a bit sequence length of 2M, wherein the second to-be-coded information comprises the first to-be-coded information, and differences between sequence numbers of information bits corresponding to the first to-be-coded information and sequence numbers of information bits at $(M+1)^{th}$ to $2M^{th}$ bit positions in information bits corresponding to the second to-be-coded information are sequentially M in ascending order of sequence numbers; and a second sending module configured to send the second coded information on a second channel corresponding to the second to-be-coded information.

12. The apparatus according to claim 11, wherein the first coding module is configured to:

obtain the first to-be-coded information and a coded bit sequence length M;

determine bit positions of first frozen bits and bit positions of first information bits in the first to-be-coded information based on M; and determine bit values at the bit positions of the first frozen bits and bit values at the bit positions of the first information bits, and perform polarization coding on all the determined bit values.

13. The apparatus according to claim 12, wherein the second coding module is configured to:

obtain the second to-be-coded information and a coded bit sequence length 2M;

determine bit positions of second frozen bits and bit positions of second information bits in the second to-be-coded information based on 2M, wherein differences between sequence numbers of the second information bits at the $(M+1)^{th}$ to $2M^{th}$ bit positions and sequence numbers of the first information bits are sequentially M in ascending order of sequence numbers; and determine bit values at the bit positions of the second frozen bits and bit values at the bit positions of the second information bits, and perform polarization coding on all the determined bit values.

14. The apparatus according to claim 13, wherein the first coding module is configured to:

obtain preset bit positions of the first frozen bits, and use bit positions other than the preset bit positions of the first frozen bits as the bit positions of the first information bits; and the second coding module is configured to:

obtain preset bit positions of the second frozen bits, and use bit positions other than the preset bit positions of the second frozen bits as the bit positions of the second information bits, wherein differences between preset sequence numbers of the second frozen bits at the $(M+1)^{th}$ to $2M^{th}$ bit positions and preset sequence numbers of the first frozen bits are sequentially M in ascending order of sequence numbers.

15. The apparatus according to claim 13, wherein the first coding module is configured to:
- determine the bit positions of the first frozen bits and the bit positions of the first information bits in the first to-be-coded information based on M according to a first preset rule; and the second coding module is configured to:
- sequentially obtain, in ascending order, bit position sequence numbers of the second frozen bits at the $(M+1)^{th}$ to $2M^{th}$ bit positions by adding bit position sequence numbers of the first frozen bits by M, and sequentially obtain, in ascending order, bit position sequence numbers of the second information bits at the $(M+1)^{th}$ to $2M^{th}$ bit positions by adding bit position sequence numbers of the first information bits by M; and
- determine the bit positions of the second frozen bits and the bit positions of the second information bits in first to $M^{th}$ bit positions according to a second preset rule.

* * * * *